2 Sheets--Sheet 1.

SAMUEL S. HEPWORTH.

Improvement in Centrifugal Machines for Draining Sugar and other Substances.

No. 4,769. Reissued Feb. 27, 1872.

Witnesses.

H. W. Ryser

Rudlooke

Inventor.

S. S. Hepworth by Theo. G. Ellis his Attorney

THE ECKERT LITHOGRAPHING CO., WASHINGTON, D. C.

SAMUEL S. HEPWORTH.

Improvement in Centrifugal Machines for Draining Sugar and other Substances.

No. 4,769. Reissued Feb. 27, 1872.

Witnesses.

H. W. Ayres

Benj. Crosse

Inventor.

S. S. Hepworth by Thos. G. Ellis his Attorney.

THE ECKERT LITHOGRAPHING CO., WASHINGTON, D. C.

UNITED STATES PATENT OFFICE.

SAMUEL S. HEPWORTH, OF YONKERS, NEW YORK, ASSIGNOR, BY MESNE ASSIGNMENTS, OF PART INTEREST TO GOUVERNEUR PAULDING.

IMPROVEMENT IN CENTRIFUGAL MACHINES FOR DRAINING SUGAR AND OTHER SUBSTANCES.

Specification forming part of Letters Patent No. 82,314, dated September 22, 1868; reissue No. 4,769, dated February 27, 1872.

*To all whom it may concern:*

Be it known that I, S. S. HEPWORTH, of Boston, in the county of Suffolk and State of Massachusetts, have invented new and useful Improvements in Centrifugal Machines; and I do hereby declare that the following is a full, clear, and exact description thereof, which will enable those skilled in the art to make and use the same, reference being had to the accompanying drawing forming part of this specification.

Figure 1:
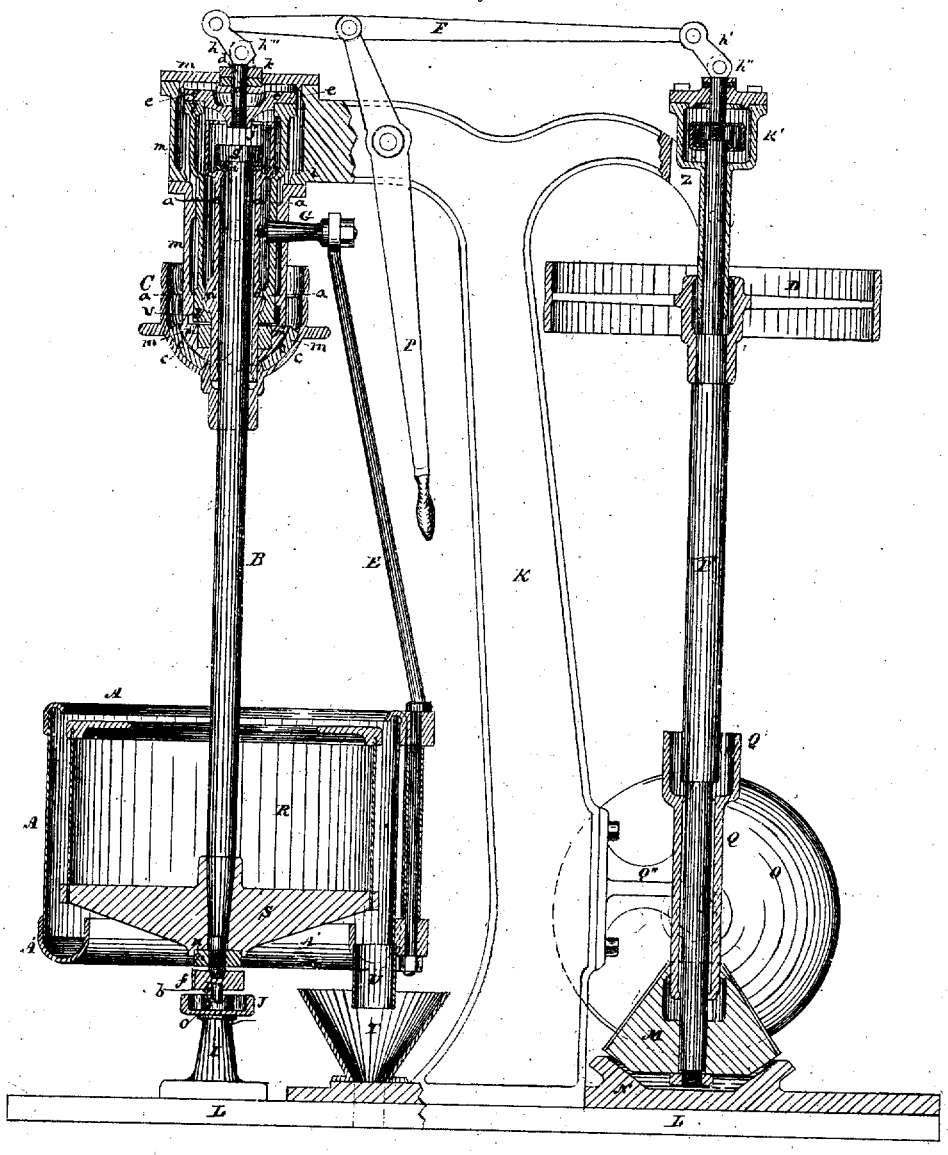
Figure 3:
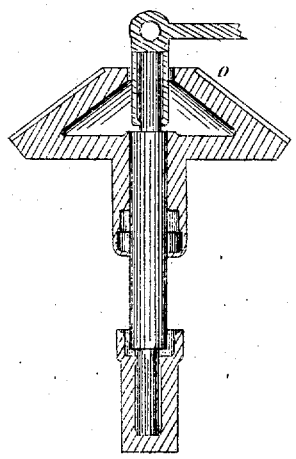
Figure 4:
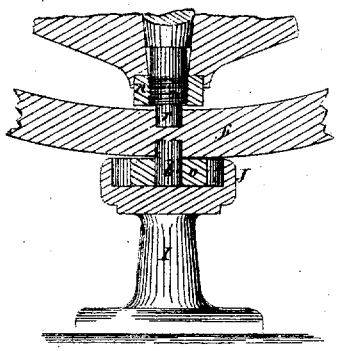
Figure 2:
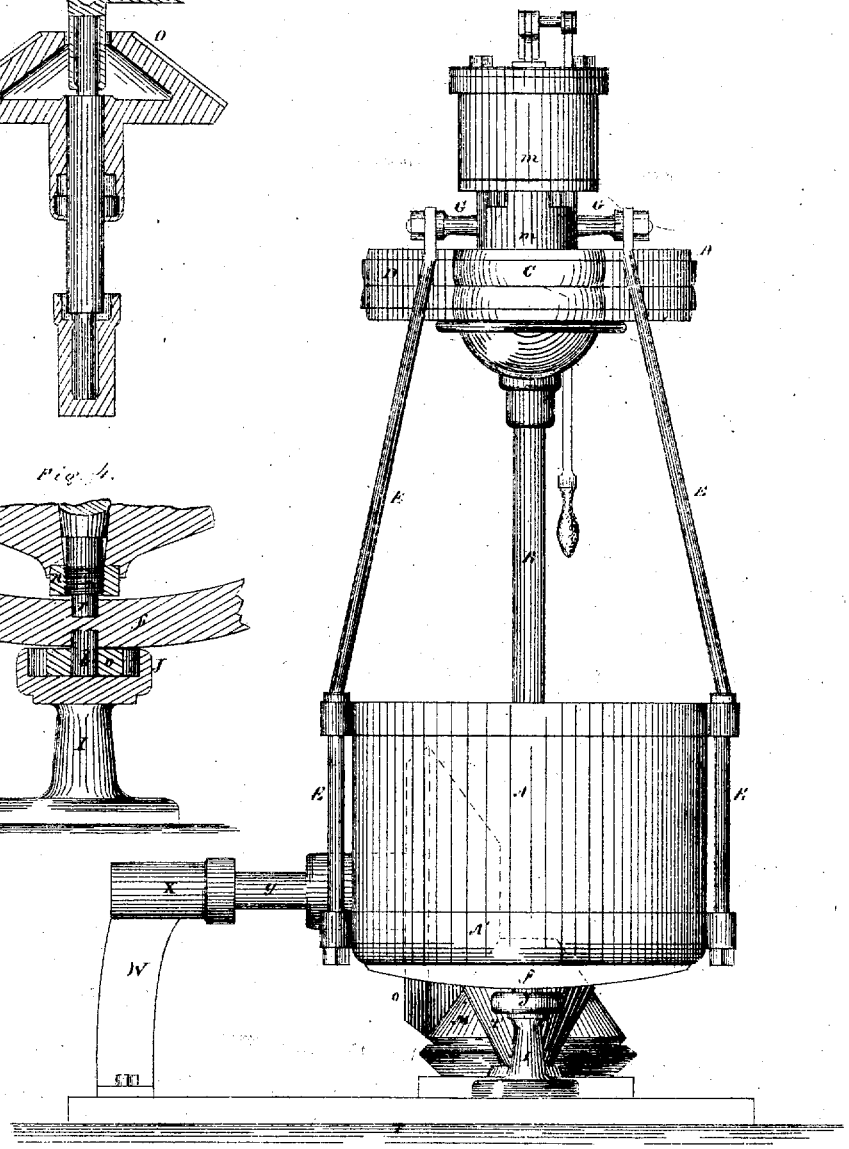

Figure 1 shows a sectional view of my improved machine and the apparatus for communicating motion to it. Fig. 2 shows a front view of the same. Fig. 3 shows a view of the wheel O detached. Fig. 4 shows an enlarged view of the lower bearing of the shaft B.

This invention refers to a class of machines used in the refining of sugar, by which the molasses is separated from the sugar by centrifugal action.

Heretofore the principal difficulty experienced in the employment of centrifugal machines was that the weight of the revolving parts, together with the contents, when revolving with great velocity, caused a gyratory vibration, which necessitates the use of the machine in the lower part of the building, where a firm and expensive foundation must be formed, to prevent the detrimental vibration of the building. The wear of such machines was rapid, occasioning frequent repairs. The tendency to gyration or irregular action is due to the impossibility of distributing the crude sugar uniformly around the central axis of the machine, and all attempts at improvement heretofore made were ineffective, as the curb or hoop exterior to the sugar-basket was fixed, which necessitated the restriction, as much as possible, of the shaft of the machine from vibration.

In my improved machine I permit this gyration, and provide a device by which it shall be uninjurious, and suspend the curb so that it also shall partake equally of the gyratory motion, and thereby remain concentric with the shaft and sugar-basket.

To accomplish these objects I employ a sugar-basket, R, made and affixed to the shaft B in the usual manner. A is the curb, exterior to the basket, and provided with an annular trough, A′, to receive the molasses or sirup, and discharge it at U into the funnel T, as previously done. But, instead of attempting to confine the shaft B to perfect axial rotation, I provide a step-bearing for its reduced end, *r*, in a metallic cross-bar, *f*, as shown, This bar is affixed securely to and across the bottom of the curb A, so that the curb and basket shall be concentric. Tapped into or otherwise affixed to the said cross-bar is a gudgeon, *b*, which works loosely within an elastic roller, *o*, of rubber or other suitable material, and both the roller and gudgeon are allowed space for gyration within a stout iron cup, J, so that when the shaft revolves, its tendency to gyrate also will be permitted by the cup and roller, but with a noisless and elastic action, which is perfectly harmless to the machine or the building. The cup J forms part of the pedestal I, which is firmly affixed to the bed-plate L, but this cup does not sustain any portion of the weight of the parts above, as will now be shown. The shaft B is suspended within a sleeve, *a*, by means of its head, *g*, resting on a bearing-ring, *i*, within the oil-cup *j*, which latter, together with the bearing-ring *i* and swelled section *a′*, forms part of the said sleeve, as shown. This swelled section fits a corresponding surface, *l′*, of the next sleeve *l*, as shown, whereby the weight of the shaft, and sugar-basket, and the contents of the latter, are supported by the sleeve *l*. The sleeve *l* is held by a large screw-bolt, *d*, which screws into the cap *e* of the sleeve *l*, as shown, the said screw-bolt *d* being upheld by a cam-link, *h*, which latter is pivoted to the screw-bolt, as shown, and rests upon washers *k*, in a recess in the top of exterior sleeve *m*, the latter sleeve being a part of the frame K, as shown. Thus, the sleeve *m* sustains the screw-bolt, and the screw-bolt sustains the second sleeve *l*, which, in turn, sustains, at *a′*, the inner sleeve *a*, which latter, lastly, sustains the weight of the revolving parts on the bearing-ring *i*. The curb A is suspended directly from the inner sleeve *a* by arms G and rods E, which pass down through lugs on the cast part of the curb A, as shown. The holes in the sleeves *l* and *m* are only sufficiently large to permit the vibration or gyration of the arms G, caused by the gyration of the shaft B. Now, when the machine is in motion, the curb A, suspended as shown, will always be concentric with the shaft B and sugar-basket, for the shaft supporting the latter has its lower bearing in the cross-bar *f* affixed to the curb, as aforesaid. The bottom S of the basket is held on the shaft by a nut, *n*, on the reduced end of the shaft B, which reduced end rests, as shown, in a step-bearing in the bar *f*. The construction is better shown in the enlarged detail view at Fig. 4. The pulley C is keyed onto the shaft B, and a belt from the pulley D to the pulley C drives the shaft B and its basket R. When it is desired to stop the machine the lever P is moved so as to bring the cam-link *h* to the left, when the shaft will be elevated a short distance, which will bring the hemispherical cavity *c* of the pulley C in contact with the corresponding hemispherical surface *m'* of the sleeve *m*, whereby a breaking effect will result from the friction of the two parts, and the revolution of the shaft be retarded, and finally stopped. The rod F, which connects the lever with the cam-link *h*, also connects with the cam-link *h'*, which is so shaped, as to its lower part, which rests on washers around the screw-bolt supporting the shaft P', that, when the said cam-link *h'* is brought forward by the lever P and rod F, the shaft will be lowered, and the base of the friction-cone M brought in contact with the friction-cup N, as shown, which will produce a braking effect. The shaft P' and the parts Q' Q Q'' R' Z O X Y W, and the arrangement thereof, forming no part of the invention claimed, will not be further dwelt upon, the drawing exhibiting their construction and operation sufficiently. The gudgeon *b* is separate and distinct from the reduced end of the shaft B, and therefore does not revolve with it. That expedient has been attempted, in connection with a roller, many years ago, but the revolution of the gudgeon caused the roller to bound from side to side within its bearings, and the device was abandoned at once, and never came into practical use.

In practice, the gudgeon *b* is cast on the cross bar *f*, in preference to being tapped into the said bar, as shown in the drawing, but in whatever manner it may be affixed or formed, its rigid character is what conduces, in connection with the roller and cup, to the perfect working of the machine. The hemispherical form of the lower part, *m'*, of the sleeve *m*, and the corresponding form of the cavity *c* of the pulley C, permit the gyration of the shaft without jar or hindrance when the brake is applied, for these surfaces are concentric, and their radiuses terminate at the center of the vibration of the shaft B, which is at some point above the friction-surfaces. This, of course, will be determined by the builder to suit the other dimensions. The gyratory vibration of the shaft is permitted by the spherical fitting of the sleeves *a* and *l*, as shown at *a' l'*, and this will give the requisite amount of play at the lower end of the shaft without otherwise providing therefor. The lower end of the link *h'* is composed of a plane surface, as shown, and a circular part, *h''*. This latter is what sustains the weight of the shaft P', and keeps the friction-cones from contact when the plane *h'''* of the cam-link *h* is brought to sustain the shaft B, when the machine is stopped to remove the drained sugar from the basket.

This device, therefore, enables the basket to be turned easily by hand in so removing the sugar, as the surfaces *c* and *m'* are then not in contact, nor are the friction-cones, as when the shaft B is supported by the plane of the cam-link *h*, which is employed when the shaft B is rotating. This invention supplies a want long felt in the employment of centrifugal machines for refining sugar, and greatly conduces to the economical working of such machines.

I claim as new, and desire to secure by Letters Patent—

1. The suspension of the shaft B and curb A, of a centrifugal machine, from a sleeve, *a*, or other equivalent device, substantially as shown and described, and for the purposes set forth.

2. Supporting the sleeve *a* by the spherical surfaces *a'* and *l'*, or surfaces approximating to a spherical surface, for the purpose of supporting and permitting the vibration or gyration of the basket-shaft B and curb A of a centrifugal machine, all as set forth.

3. A centrifugal machine, in which the revolving basket and shaft remain concentric with the curb, and the whole is supported at the top by a ball-and-socket or other flexible joint, and at the bottom by a laterally-elastic bearing, substantially as and for the purpose herein specified.

4. Employing the pulley C and lower end of the sleeve *m* as friction-surfaces, for the purpose of retarding and stopping the revolution of the basket-shaft B of a centrifugal machine, all as set forth.

5. Making the surfaces *c* and *m'* spherical, for the purpose of permitting the gyration of the basket-shaft B, all substantially as shown and described.

6. The gudgeon *b*, affixed rigidly to the cross-bar *f*, or other equivalent bottom part of the curb A, substantially as shown and described, in combination with a roller, *o*, and cup J, or its equivalent, as and for the purpose set forth.

7. The employment of an elastic roller, *o*, substantially as shown and described, in combination with the fixed gudgeon *b*, or other equivalent device, and cup J, or its equivalent, all as and for the purpose set forth.

S. S. HEPWORTH.

Witnesses:
PETER KEMBLE,
I. N. PAULDING.